US007889123B1

(12) United States Patent
Warloe

(10) Patent No.: US 7,889,123 B1
(45) Date of Patent: Feb. 15, 2011

(54) GLOBAL POSITIONING SYSTEM (GPS) ASSEMBLY TEST USING WIRELESS TRANSMISSION

(75) Inventor: Andreas Warloe, Fountain Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 314 days.

(21) Appl. No.: 12/200,342

(22) Filed: Aug. 28, 2008

(51) Int. Cl.
*G01S 1/00* (2006.01)
*H04B 7/185* (2006.01)
*H01Q 3/24* (2006.01)

(52) U.S. Cl. .................. 342/357.1; 342/357; 342/173; 342/165; 455/115.1; 455/115.2

(58) Field of Classification Search ................ 342/357, 342/165, 173; 455/115.1, 115.2
See application file for complete search history.

(56) References Cited

U.S. PATENT DOCUMENTS

| | | | | |
|---|---|---|---|---|
| 7,130,589 | B2 * | 10/2006 | Lee et al. ................. | 455/67.11 |
| 7,136,772 | B2 * | 11/2006 | Duchi et al. ................ | 702/118 |
| 7,177,772 | B2 * | 2/2007 | Largey et al. ................ | 702/65 |
| 7,415,246 | B2 * | 8/2008 | Kim et al. ................ | 455/67.11 |
| 7,460,840 | B2 * | 12/2008 | Creigh ..................... | 455/115.1 |
| 7,567,787 | B2 * | 7/2009 | Kuo et al. ................... | 455/217 |
| 7,616,929 | B2 * | 11/2009 | Behzad .................... | 455/67.14 |
| 7,620,368 | B2 * | 11/2009 | Wang et al. ............... | 455/67.11 |
| 2006/0082494 | A1 * | 4/2006 | Deininger et al. ........... | 342/165 |
| 2006/0290496 | A1 * | 12/2006 | Peeters .................... | 340/572.1 |
| 2007/0026809 | A1 * | 2/2007 | Zhang et al. ............. | 455/67.11 |
| 2007/0098118 | A1 * | 5/2007 | Muhammad et al. ........ | 375/344 |
| 2009/0318103 | A1 * | 12/2009 | Feenaghty et al. ....... | 455/226.3 |

OTHER PUBLICATIONS

Jeremy Aber, Jerry Harvey, John Inmon, "GPS and its Emerging Role in Cellular Phones and Car Navigation Systems", Dec. 10, 2003.*

* cited by examiner

*Primary Examiner*—Thomas H Tarcza
*Assistant Examiner*—Frank McGue
(74) *Attorney, Agent, or Firm*—Withrow & Terranova, P.L.L.C.

(57) ABSTRACT

A GPS assembly test system and method for a wireless communications device, such as a mobile telephone, having an integrated GPS receiver. The GPS assembly test can be performed without the requirement of external testing equipment. The GPS assembly test activates the wireless communications device transmitter during testing to increase GPS in-band noise. If the GPS receiver components are installed and operating properly, a change in noise is expected and can be detected. Embodiments include test software to initiate the transmitter during testing. Different methods can be used to detect a change in noise density. For example, an expected automatic reduction in gain control to a low noise amplifier (LNA) can be detected when the transmitter is activated. Another example includes setting LNA gain to a fixed gain and detecting expected changes in data generated an analog-to-digital (A/D) converter in response to the increased noise.

21 Claims, 6 Drawing Sheets

GLOBAL POSITIONING SYSTEM (GPS) ASSEMBLY TEST USING WIRELESS TRANSMISSION

FIELD OF THE INVENTION

The present invention relates to a testing technique for a global positioning system (GPS) receiver, and in particular a testing technique that does not require external test equipment.

BACKGROUND OF THE INVENTION

The global positioning system (GPS) is based on an earth-orbiting constellation of twenty-four satellite vehicles each broadcasting its precise location and ranging information. In order to calculate a three-dimensional location, a receiver must determine the distance from itself to at least four satellite vehicles. This is accomplished by first determining the location of at least four satellite vehicles using ephemeris data received from the satellites. Once the locations of the satellites have been determined, estimates of the distance from the receiver to each of the satellites are calculated based upon the measured time it takes the signals to travel from each satellite to the receiver. The position, and the accurate time of measurement, of the receiver may then be determined by a method of triangulation.

Many mobile phones include an integrated GPS receiver. A GPS receiver allows a mobile service provider to determine the location of the mobile phone typically within tens of meters. This is mandated for emergency services by most governmental communication agencies. For example, providing emergency 911 (E911) services for mobile phones is mandated by the Federal Communications Commission (FCC) in the United States. In addition the current geographic location of the mobile phone can be used for a variety of other purposes, including providing walking or driving directions to a user or providing location-based information and search results to phone applications.

During manufacturing of a mobile phone, testing is performed to ensure the mobile phone is operating properly. "Fast self testing" may be employed to quickly check that all components are mounted and are operating properly. This includes both the GPS receiver circuitry and the regular cellular transceiver circuitry. External test equipment is generally employed to perform assembly testing for the GPS receiver circuitry. Such testing equipment typically includes harnesses that connect to the mobile phone components to be tested. Further, the test equipment may require routine maintenance and calibration. All of these factors contribute towards less efficient manufacturing and higher testing costs. Manufacturing costs could be reduced and efficiencies increased if testing of the GPS receiver circuitry could be accomplished without use of external testing equipment. It would be advantageous if inherent operating characteristics of the mobile phone could be used to perform testing.

SUMMARY OF THE INVENTION

Embodiments of the present invention include a GPS assembly test system and method for a wireless communications device having an integrated GPS receiver. The wireless communications device may be a mobile telephone. The GPS assembly test can be performed using inherent operating features of the wireless communications device and without the necessary use of external testing equipment. The GPS assembly test takes advantage of the wireless communications device transmitter's ability to generate and significantly increase GPS in-band noise density. Wireless communications device transmitter signals are much stronger than GPS signals. Wireless communications device transmitters are powerful enough to inherently generate noise outside the transmitter band that may fall within the GPS receiver band. Thus, the GPS receiver will not filter out any such GPS in-band noise generated by the wireless communications device transmitter as an out-of-band signal Thus, the wireless communications device transmitter can be activated and used to transmit signals to create and increase GPS in-band noise during a GPS assembly test. As such, the GPS in-band noise resulting from the transmitted signal will be received by the GPS receiver. If the GPS receiver components are installed and operating properly, a change in noise density can be detected. The change in noise density can be analyzed as an indication that the GPS receiver components are installed and operating properly.

In this regard, a GPS in-band nominal noise level when transmissions are not occurring is first determined during the test. The transmitter of the wireless communications device is then activated. The GPS in-band noise level occurring during transmissions is detected or measured. The nominal noise level is then compared to the noise level when transmissions are occurring to determine if the GPS receiver components are properly installed and operating. If an expected increase in GPS in-band noise occurs, this is an indication that the GPS receiver and its components may be properly installed and operational.

The nominal noise level may be determined empirically and pre-programmed into the wireless communication device. Alternatively, the nominal noise level may be determined by the wireless communication device during actual testing and before transmission is activated. Determining the nominal noise level during actual testing compensates for any noise level variances that may occur due to surroundings of the wireless communications device during testing. Programmed nominal noise levels may be acceptable if variations in surroundings do not cause the GPS in-band nominal noise level in the GPS receiver to vary significantly.

In one embodiment, the wireless communications device having an integrated GPS receiver is a mobile telephone. The mobile telephone wireless transmitter may be any type, including but not limited to "Global System for Mobile Communications" (GSM), "Time Division Multiple Access" (TDMA), and "Code Division Multiple Access" (CDMA). Test software can be included in the mobile telephone to initiate a GPS assembly test wherein the mobile phone transmitter is commanded to transmit a RF signal during testing. Several methods can be used to detect a change in noise density.

For example, an automatic gain control (AGC) loop control signal configured by the GPS signal processing logic to control variable gain amplifier (VGA) gain can be measured during a GPS assembly test. The mobile phone transmitter is activated to generate noise density. The GPS signal processing logic is designed to reduce gain as the noise level increases. Thus, a reduction in gain in the AGC control signal should be detected in response to the transmitter transmitting RF signals if the GPS receiver components are installed and operating properly. The reduction in gain can be analyzed to characterize the proper installation and/or operation of the GPS receiver.

As another example, the AGC loop may be set to a fixed gain during a GPS assembly test. The mobile phone transmitter is then activated to generate noise density. Change in the data generated by an analog-to-digital (ND) converter in the RF signal chain is expected, because the gain is fixed. During testing, the GPS signal processing logic cannot change the gain to offset the change in noise. The change in data generated by the analog-to-digital (ND) converter can be analyzed to characterize the installation and/or operation of the GPS receiver.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Embodiments of the present invention include a GPS assembly test system and method for a wireless communications device having an integrated GPS receiver. The wireless communications device may be a mobile telephone. The GPS assembly test can be performed using inherent operating features of the wireless communications device and without the necessary use of external testing equipment. The GPS assembly test takes advantage of the wireless communications device transmitter's ability to generate and significantly increase GPS in-band noise density. Wireless communications device transmitter signals are much stronger than GPS L1 or L2 signals. Wireless communications device transmitters are powerful enough to inherently generate noise outside the transmitter band that may fall within the GPS receiver band. Thus, the GPS receiver will not filter out any such in-band noise generated by the wireless communications device transmitter as an out-of-band signal. Thus, the wireless communications device transmitter can be activated and used to transmit signals to create and increase GPS in-band noise during a GPS assembly test. As such, the GPS in-band noise from the transmitted signal will be received by the GPS receiver. If the GPS receiver components are installed and operating properly, a change in noise density can be detected. The change in noise density can be analyzed as an indication that the GPS receiver components are installed and operating properly.

Figure 1:
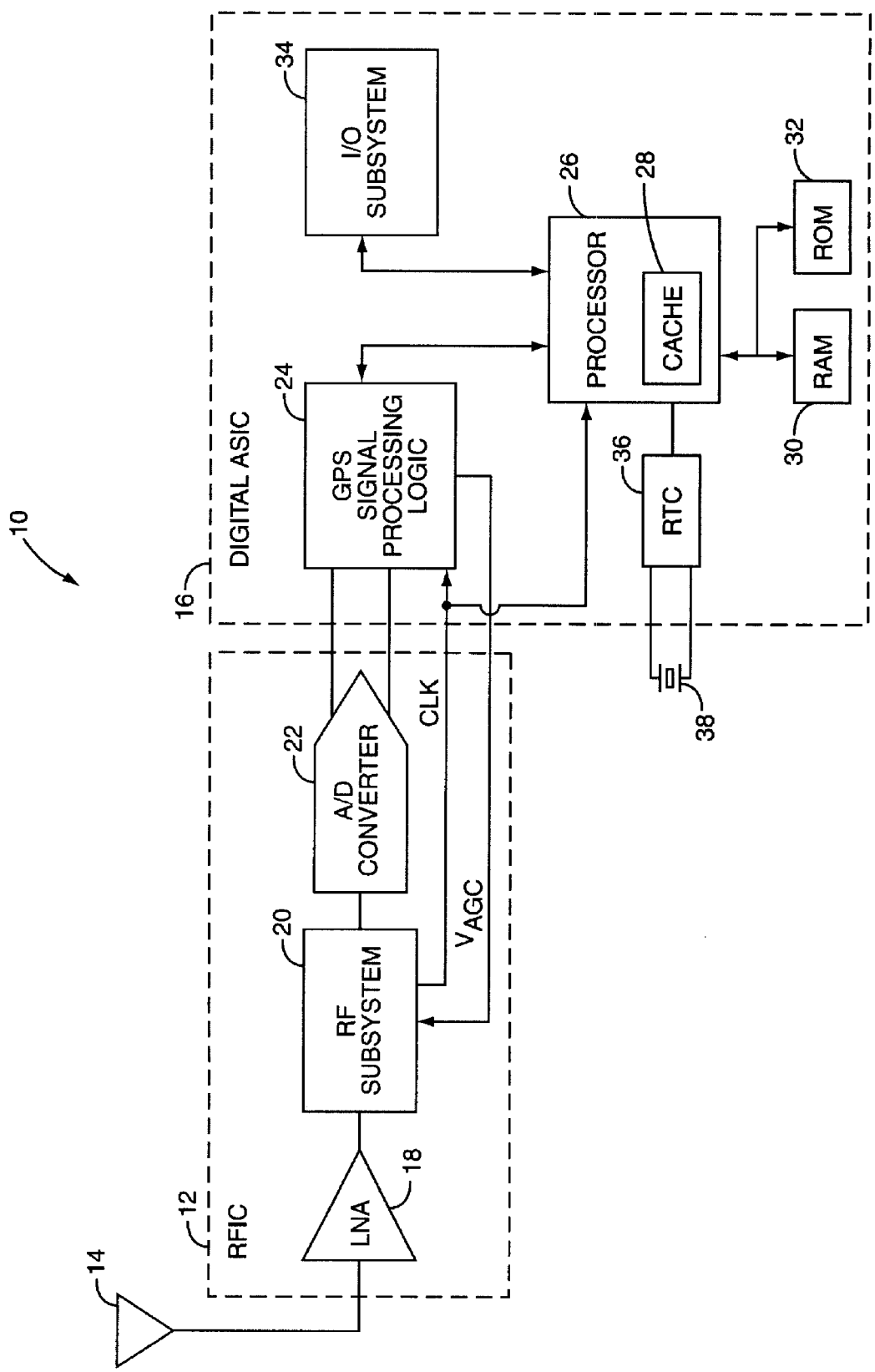
FIG. 1 illustrates a block diagram of a typical GPS receiver according to one embodiment of the present invention.

The present invention is preferably incorporated in a GPS receiver 10. One embodiment of the basic architecture of a GPS receiver 10 is represented in FIG. 1. The GPS receiver 10 may include a radio frequency integrated circuit (RFIC) 12, an antenna 14, and a digital application specific integrated circuit (ASIC) 16. The RFIC 12 receives information previously modulated on a radio frequency carrier from one or more satellite vehicles through the antenna 14. A low noise amplifier (LNA) 18 amplifies the signal. A radio frequency (RF) subsystem 20 filters and downconverts the amplified signal while ensuring that the components of the RF subsystem 20 operate in their respective linear regions. An analog-to-digital (A/D) converter 22 then digitizes the baseband analog signal into one or more digital streams. The RFIC 12 typically uses an automatic gain control (AGC) signal from the digital ASIC 16 to control signal levels presented to the A/D converter 22.

The digital ASIC 16 processes the digitized baseband signal to extract the information and data bits conveyed in the received signal. GPS signal processing logic 24 typically communicates with a processor 26 to perform such operations as demodulation, decorrelation, decoding, and error correction. The processor 26 may have either internal or external cache 28 in order to increase processing efficiency. The processor 26 is typically interfaced to random-access memory (RAM) 30 and read-only memory (ROM) 32. The random-access memory 30 is used by the processor 26 to store GPS related information such as ephemeris data, almanac data, last known position, etc. The read-only memory 32 stores program instructions to be executed by the processor 26. The processor 26 is also operatively connected to an input/output (110) subsystem 34 in order to communicate with external devices. Typically, a real-time clock (RTC) 36 driven by an oscillator 38 is operatively connected to the processor 26 to assist in position calculations performed by the processor 26.

The GPS signal processing logic 24 may also be operatively connected to the RF subsystem 20 such that an AGC signal (VAGC) may be sent to the RF subsystem 20. The GPS signal processing logic 24 controls the AGC signal in response to desired amplification levels. The GPS signal processing logic 24 typically controls gain such that GPS in-band background noise will be amplified and sampled by the A/D converter 22. However, as the noise level increases, the GPS signal processing logic 24 is designed to decrease the gain level to minimize amplification of noise and sampling error, via control of the AGC signal. Thus, a change in the AGC signal in response to noise can be one indication that components of the GPS receiver 10 are installed and operating properly.

Figure 2:
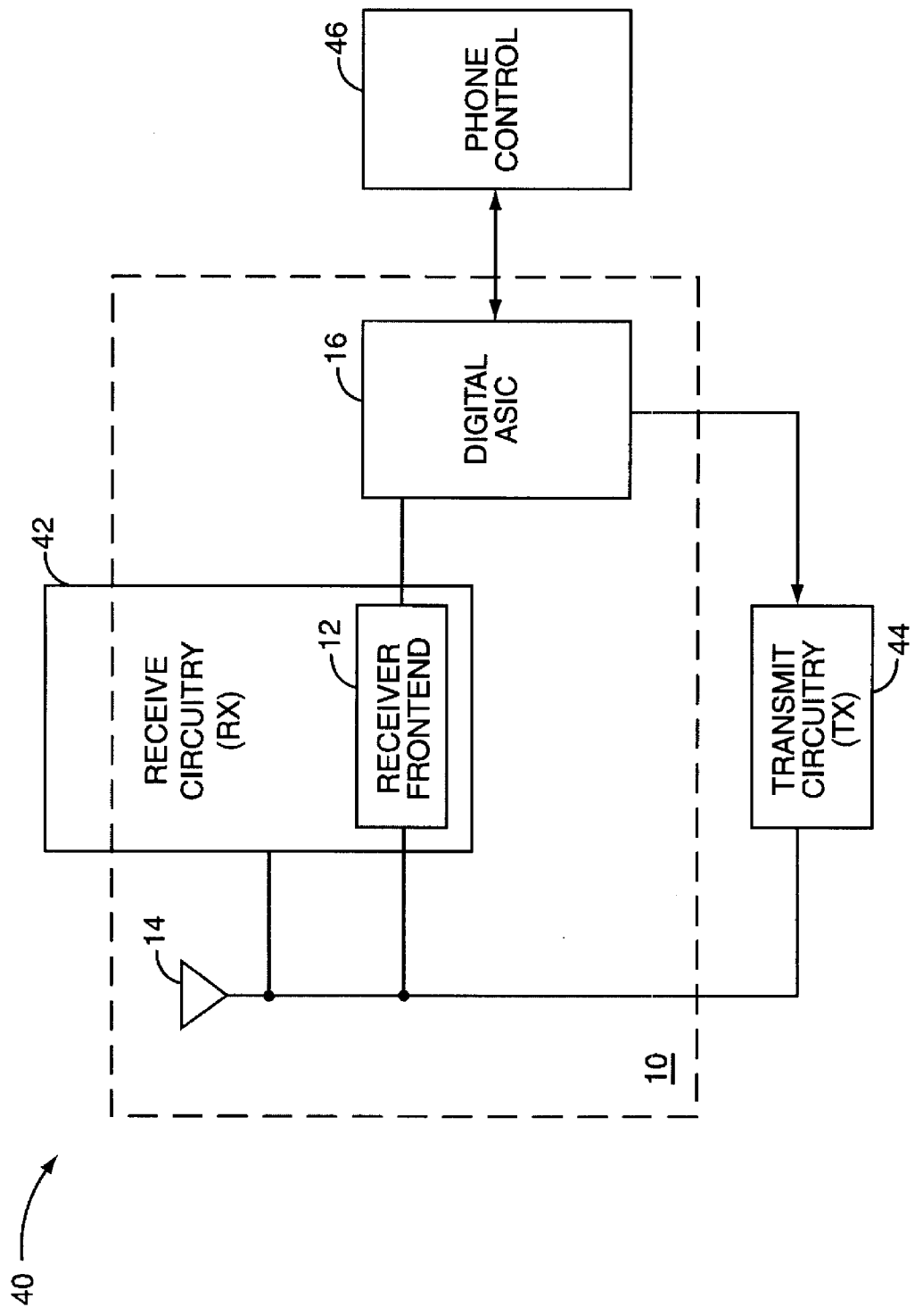
FIG. 2 illustrates a typical GPS receiver incorporated in a wireless communications device according to one embodiment of the present invention.

FIG. 2 is a simplified block diagram of the GPS receiver 10 being used in combination with a wireless communications device 40, such as a mobile telephone. The wireless communications device 40 may include receive (RX) circuitry 42, transmit (TX) circuitry 44, and control and processing circuitry 46, also called phone control 46. The receive circuitry 42 operates to receive the GPS signal and any communication signals. The transmit circuitry 44 operates to transmit communication signals from the wireless communications device 40. The control and processing circuitry 46 operates to process the communications signals sent to the wireless communications device 40 and send communications data to the transmit circuitry 44 to be transmitted as the communications signals. The receive circuitry 42 and the transmit circuitry 44 are shown to use the antenna 14, which is also used to receive the GPS signal. However, the receive circuitry 42 and the transmit circuitry 44 may use separate antennas (not shown) to transmit and receive the communication signals. In this instance, the antennas may be co-located with each other in the wireless communications device 40.

When the GPS receiver 10 co-exists with a wireless transmitter, such as transmit circuitry 44 in the wireless communications device 40 illustrated in FIG. 2, it is noted that the wireless transmitter can raise the GPS in-band noise density significantly. The wireless transmitter is intended to generate RF signals that are in a desired wireless communications band and out of the GPS band. However, the wireless transmitter is powerful enough to generate spurious signals that may be in the GPS band. This can raise the GPS in-band noise significantly, because GPS in-band signals are not filtered out by the GPS receiver 10. For example, normal background noise in the GPS receiver 10 when transmit circuitry 44 is not transmitting may be −174 dB/Hz. However, when the transmit circuitry 44 is transmitting, the GPS in-band noise may rise to −130 dBm/Hz because of the GPS in-band noise generated by the transmit circuitry 44. Thus, the transmit circuitry 44 can be controlled to increase the GPS in-band noise in the GPS receiver 10. This observation forms a principle of the present invention, which is to test the GPS receiver 10 using the on-board transmit circuitry 44 without the requirement of external test equipment. If the transmit circuitry 44 is activated during testing and the GPS receiver 10 is installed and operating properly, an increase in GPS in-band noise is expected and detectable. A detection of increased GPS in-band noise provides an indication that the GPS receiver 10 is likely installed and operating properly.

Figure 3:
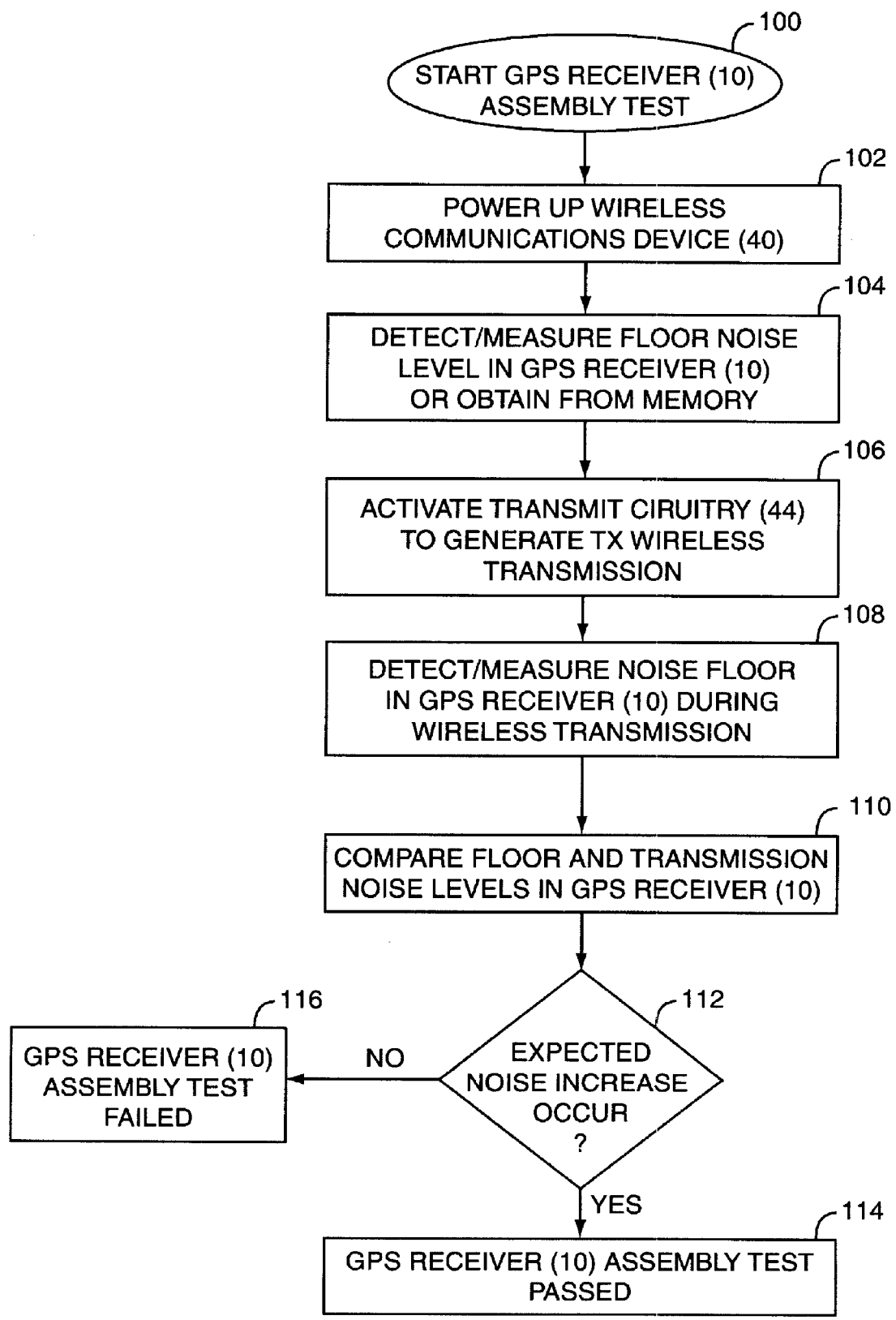
FIG. 3 is a flowchart illustrating a general GPS assembly test system and method according to one embodiment of the present invention.

In this regard, the basic operation of one embodiment of the GPS assembly test system and method is illustrated in the flowchart of FIG. 3. The test is started (step 100) by first powering up the wireless communications device 40 if not already powered on (step 102). In a preferred embodiment, the wireless communications device 40 may be designed to power-up in a test mode. In this instance, the phone control 46 may command the digital ASIC 16 to also enter into test mode. The phone control 46 and the processor 26 may then execute test software to carry out the GPS assembly test. The test software may be stored in memory in the wireless communications device 40. For the digital ASIC 16, the test software may be stored in either RAM 30 or ROM 32. The wireless communications device 40 may be designed to power up in a test mode. Alternatively, a setting may be initiated to place the wireless communications device 40 in test mode, including but not limited to switch settings or a particular combination of keypad (not shown) strokes on the mobile phone and recognized by the phone control 46.

Note that the component(s) that control or execute the testing of the GPS receiver 10 may also be referred to as a "control system." In the preferred embodiment, the control system involves the digital ASIC 16. The phone control 46 and the processor 26 of the digital ASIC 16 are both involved in testing. However, also note that the control system can be any component of the wireless communications device 40. The control system may include a single component or multiple components. All of the aforementioned variations are within the scope of the present invention.

Next, the GPS in-band noise may be detected or measured and recorded so that the nominal noise level is known before testing begins (step 104). Alternatively, the nominal noise level may be pre-programmed into memory in the wireless communications device 40 based on empirical testing, such as memory in the phone control 46 and/or the digital ASIC 16 (28, 30, 32) (step 104). The nominal noise level is the amount of noise without wireless transmission. For example, the nominal noise level may be −170 dBm/Hz if the transmit circuitry 44 is a GSM transmitter. This nominal noise level may be used for comparison purposes to determine if the GPS receiver 10 is installed and operating properly. The processor 26 may be coupled to various detection or measurement devices that are coupled to various components of the GPS receiver 10 to detect GPS in-band noise at various nodes. The test software may also interface with such detection or measurement devices.

Next, the transmit circuitry 44 is activated to transmit RF signals in the desired wireless communications band, which will inherently create GPS in-band noise (step 106). As such, the noise from the transmitted signals will be received by the GPS receiver 10. This will increase the GPS in-band noise from the nominal noise level before transmission. If the GPS receiver 10 and its components are installed and operating properly, this increase in GPS in-band noise should be detectable. This is also called the transmission noise. In this regard, the GPS in-band noise is detected or measured and recorded during the transmission (step 108). For example, the GPS in-band noise during transmission may be −130 dBm/Hz if the transmit circuitry 44 is a GSM transmitter.

The floor and transmission noise levels before and during transmissions are then compared (step 110). This comparison is preferably made by the phone control 46, but may also be made by processor 26. If the GPS in-band noise increases in an expected manner (decision 112), this is an indication that the GPS receiver 10 and its components may be installed and operating properly. The optimal limit for increase in GPS in-band noise to determine that the GPS receiver 10 and its components are installed and operating properly may be determined heuristically. If the signal increases beyond the set limit in test, the GPS receiver 10 assembly test will be passed (step 114). If the GPS in-band noise did not increase in an expected manner (decision 112), this is an indication that the GPS receiver 10 and its components are not installed and operating properly. In this instance, the GPS receiver 10 assembly test will be failed (step 116).

Figure 4:
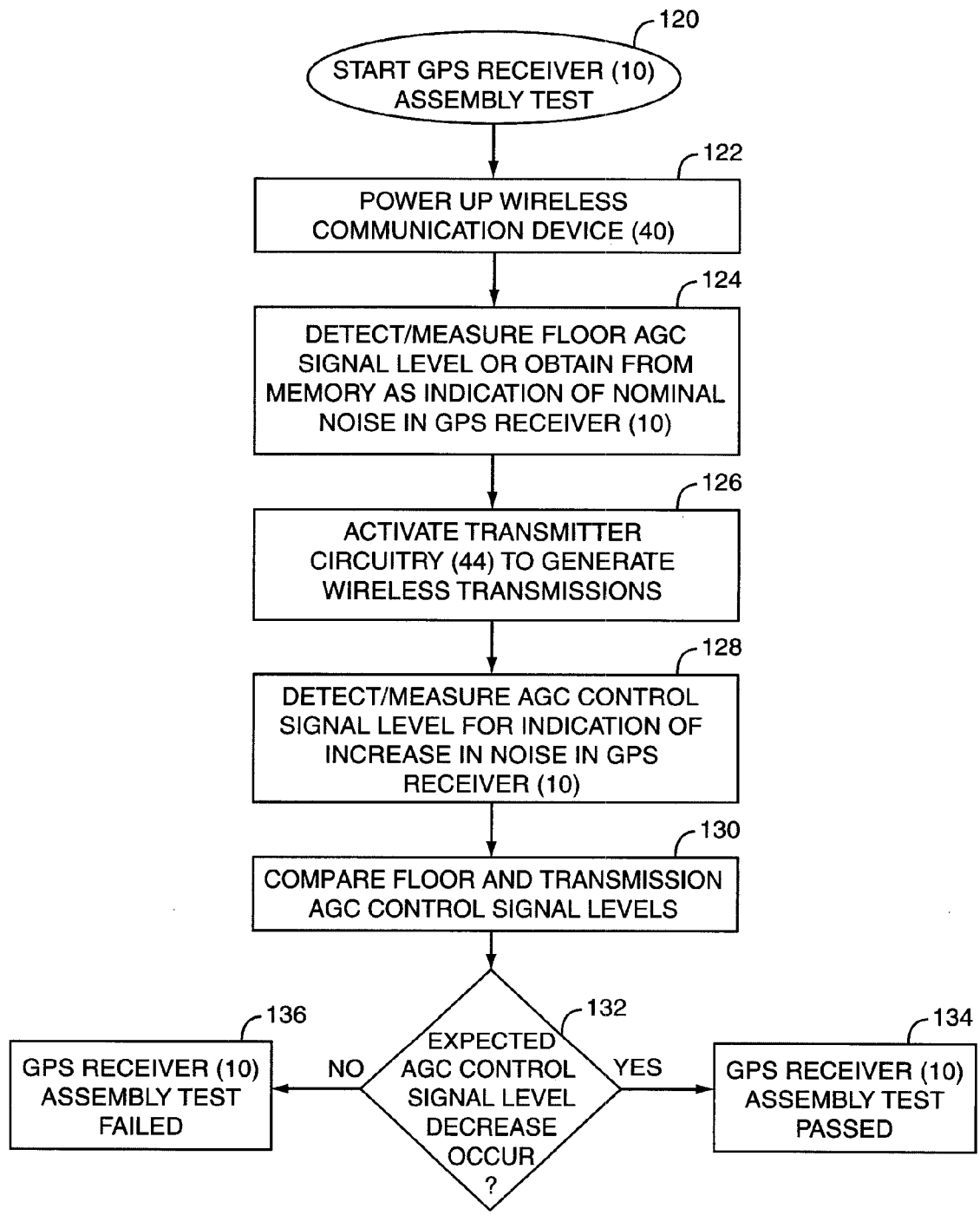
FIG. 4 is a flowchart illustrating a GPS assembly test system and method employing automatic gain control (AGC) monitoring according to one embodiment of the present invention.
Figure 5:
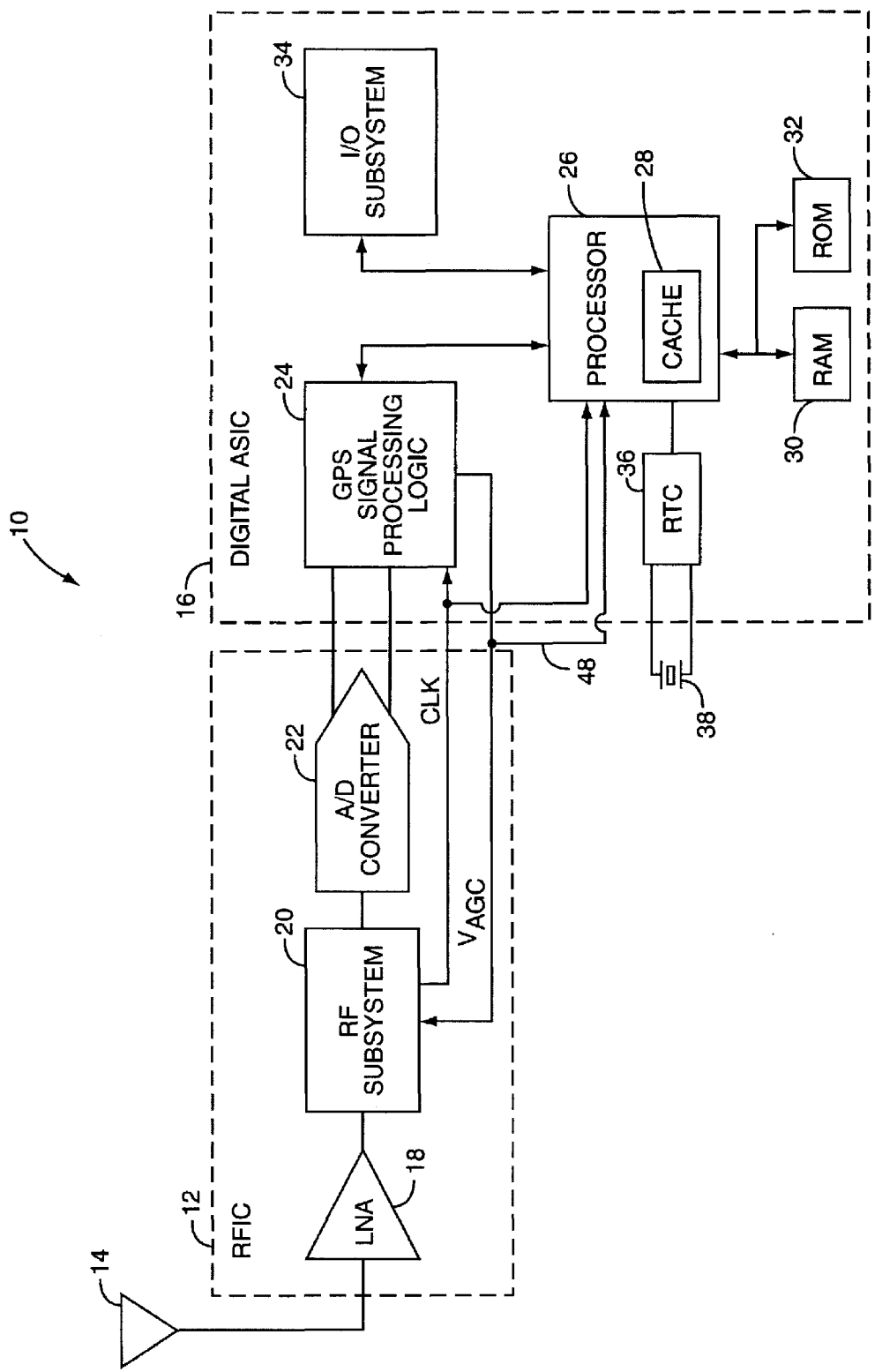
FIG. 5 illustrates a block diagram of the GPS receiver illustrated in FIG. 2 with GPS in-band noise detection components according to one embodiment of the present invention.
Figure 6:
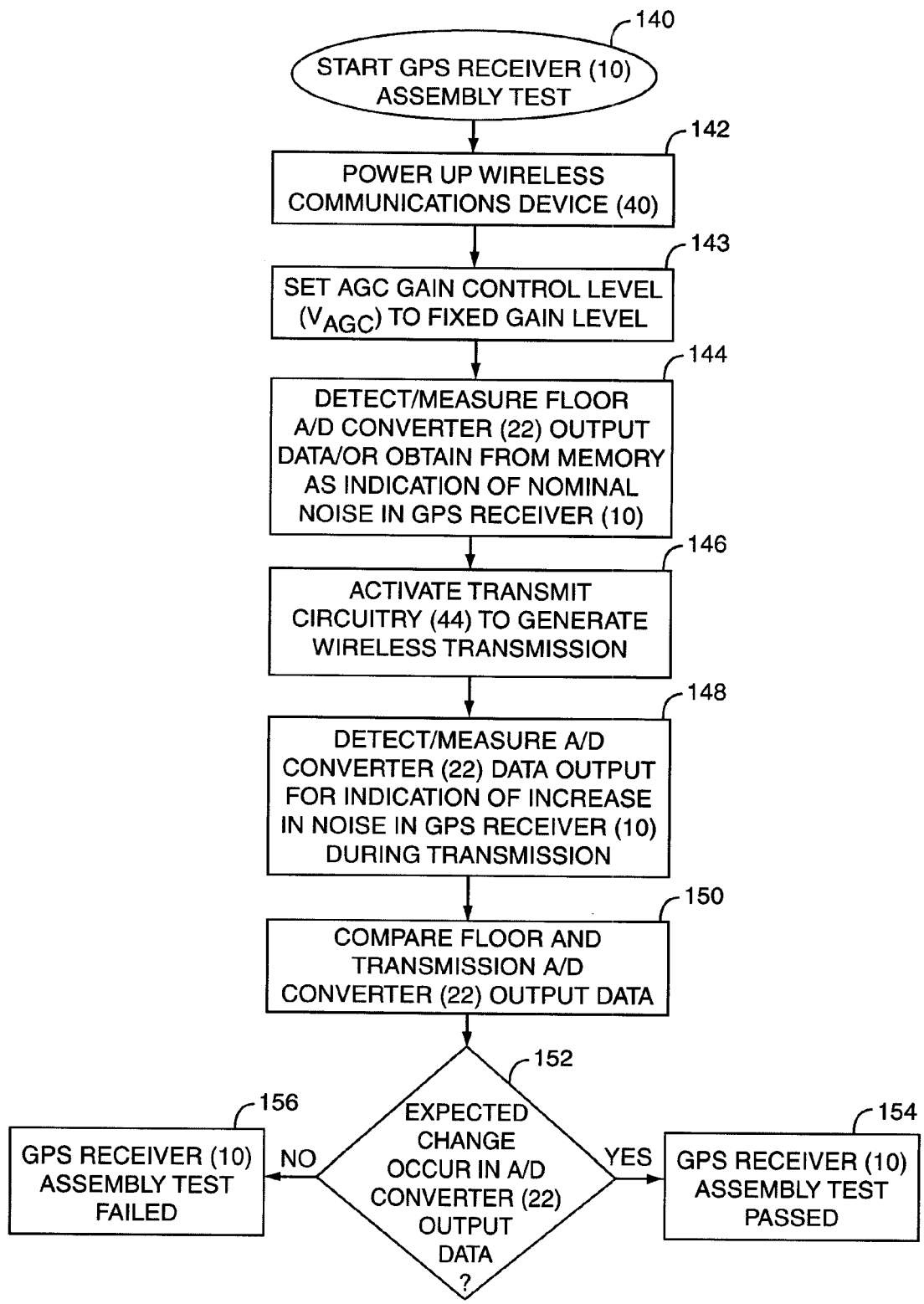
FIG. 6 is a flowchart illustrating a GPS assembly test system and method employing fixed automatic gain control (AGC) and monitoring of a digitized GPS signal according to one embodiment of the present invention.

Any method that can be used to detect a change in GPS in-band noise density is contemplated in the scope of the present invention. FIGS. 4-6 illustrate further examples, which are discussed below.

FIG. 4 illustrates a flowchart of one example of performing a GPS receiver test. In this example, the AGC loop set by the GPS signal processing logic 24 to control the gain of the LNA 18 gain can be measured. The GPS signal processing logic 24 is designed to reduce the AGC level as the GPS in-band noise level increases. Thus, a reduction in gain in the AGC control signal should be detected in response to the transmit circuitry 44 transmitting RF signals if the GPS receiver 10 components are installed and operating properly. The reduction in gain can be analyzed to characterize the proper installation and/or operation of the GPS receiver 10.

In this regard, the test is started (step 120) by first powering up the wireless communications device 40 if not already powered on (step 122). As discussed in the flowchart of FIG.

3, the phone control 46 and processor 26 may then execute test software, for example, when the wireless communications device 40 is in a GPS assembly test mode. The wireless communications device 40 may be designed to power up in a test mode. Alternatively, a setting may be initiated to place the wireless communications device 40 in test mode, including but not limited to switch settings or a particular combination of keypad (not shown) strokes on the mobile phone 40 and recognized by the phone control 46.

Next, the AGC control signal level may be detected or measured and recorded so that the nominal AGC control signal level for a nominal noise level is known before testing begins (step 124). Alternatively, the nominal or floor AGC control signal level may be pre-programmed into memory in the wireless communications device 40 based on empirical testing, such as memory in the phone control 46 and/or the digital ASIC 16 (28, 30, 32) (step 124). In this regard as an example, the GPS receiver 10 of FIG. 1 may be modified, as illustrated in FIG. 5, so that processor 26 is coupled to an AGC control signal level line 48 coupled to VAGC. In this manner, the processor 26 can detect or measure the AGC control signal level representing the AGC gain for a nominal noise level without transmissions. The processor 26 may execute test software that detects or measures the AGC control signal level via the AGC signal level line 48. This AGC control signal level representing a nominal noise level may be used for comparison purposes to determine if the GPS receiver 10 is installed and operating properly.

Next, the transmit circuitry 44 is activated to transmit RF signals in the transmitter band which will inherently cause noise to be created in the GPS band as create GPS in-band noise (step 126). As such, the transmitted signals will be received by the GPS receiver 10. This will increase the GPS in-band noise from the nominal noise level before transmission. If the GPS receiver 10 and its components are installed and operating properly, this increase in GPS in-band noise should be detectable. In this regard, the AGC control signal level is detected or measured and recorded (step 128). If the GPS in-band noise increases as a result of transmission, the AGC control signal level should be lowered by the GPS signal processing logic 24 to reduce gain in response. The AGC control signal levels before and during transmissions are compared as a means of comparing noise levels (step 130). The phone control 46 preferably performs this comparison, but as stated above, the processor 26 could also be programmed to make this comparison as well. If the AGC control signal level did decrease in an expected manner (i.e. the GPS in-band noise increased in an expected manner) (decision 132), this is an indication that the GPS receiver 10 and its components may be installed and operating properly. In this instance, the GPS receiver 10 assembly test will be passed (step 134). If the AGC control signal level did not decrease in an expected manner during transmission (i.e. the GPS in-band noise did not increase in an expected manner) (decision 132), this is an indication that the GPS receiver 10 and its components are not installed and operating properly. In this instance, the GPS receiver 10 assembly test will be failed (step 136).

FIG. 6 illustrates a flowchart of another example of performing a GPS receiver 10 test assembly. In this example, the AGC loop may be set to a fixed gain during a GPS assembly test. The transmit circuitry 44 is then activated to generate GPS in-band noise density. Change in the data generated by an analog-to-digital (A/D) converter 22 in the RF signal chain is expected, because the gain is fixed. During testing, the GPS signal processing logic 24 cannot change the gain to offset the change in noise. Thus, a change in data generated by the analog-to-digital (ND) converter 22 should be detected in response to the transmit circuitry 44 transmitting RF signals if the GPS receiver 10 components are installed and operating properly.

In this regard, the test is started (step 140) by first powering up the wireless communications device 40 if not already powered on (step 142). As discussed in the flowchart of FIG. 3, the phone control 46 and processor 26 may then execute test software, for example, when the wireless communications device 40 is in a GPS assembly test mode. The wireless communications device 40 may be designed to power up in a test mode. Alternatively, a setting may be initiated to place the wireless communications device 40 in test mode, including but not limited to switch settings or a particular combination of keypad (not shown) strokes on the mobile phone and recognized by the phone control 46. The AGC gain level (VAGC) is then set to a fixed gain level (step 143). This is preferably performed by the processor 26, wherein the processor 26 instructs the GPS signal processing logic 24 to set VAGC to a fixed gain level. In this manner, the GPS signal processing logic 24 will not compensate for changes in GPS in-band noise during transmission, such that a change in GPS in-band noise will result in a detectable change in data output from the ND converter 22.

Next, the data output from the A/D converter 22 may be detected or measured and recorded so that the nominal data output from the ND converter 22 for a nominal noise level at the set AGC gain is known before testing begins (step 144). Alternatively, the nominal data output from the ND converter 22 may be pre-programmed into memory in the wireless communications device 40 based on empirical testing, such as memory in the phone control 46 and/or the digital ASIC 16 (28, 30, 32) (step 144). The processor 26 may execute test software that detects or measures the data output from the A/D converter 22. In this regard as an example, the processor 26 may receive the ND converter 22 data output via the GPS signal processing logic 24. The processor 26 uses this information to represent a nominal noise level when transmissions are not occurring. This data representing a nominal noise level may be used for comparison purposes to determine if the GPS receiver 10 is installed and operating properly.

Next, the transmit circuitry 44 is activated to transmit RF signals to create GPS in-band noise (step 146). As such, the transmitted signals will be received by the GPS receiver 10. This will increase the GPS in-band noise from the nominal noise level before transmission. If the GPS receiver 10 and its components are installed and operating properly, this increase in GPS in-band noise should be more easily detectable by data output by the ND converter 22 since the AGC gain level is fixed. If the GPS in-band noise properly increases as a result of transmission, an expected change should be noted in the data output from the ND converter 22. By setting the AGC gain to a fixed gain level, a more significant change in data should occur than would otherwise occur if the AGC gain level were not fixed. This is because the GPS signal processing logic 24 will not operate as normal and compensate for noise present in the GPS receiver 10 by reducing the AGC gain signal level. If such noise compensation were allowed, a change in data output by the ND converter 22 may be more difficult to detect.

In this regard, the data output from the ND converter 22 is detected or measured and recorded (step 148). The data output by the ND converter 22 before and during transmissions are compared as a means of comparing noise levels (step 150). The phone control 46 preferably performs this comparison, but as stated above, the processor 26 could also be programmed to make this comparison as well. If the GPS in-band noise increases in an expected manner during transmission via detection of an expected change in the data output by the ND converter 22 (decision 152), this is an indication that the GPS receiver 10 and its components may be installed and operating properly. In this instance, the GPS receiver 10 assembly test will be passed (step 154). If however, the GPS in-band noise did not increase in an expected manner during transmission via detection of an expected in the data output by the ND converter 22 (decision 152), this is an indication that the GPS receiver 10 and its components are not installed and operating properly. In this instance, the GPS receiver 10 assembly test will be failed (step 156).

Those skilled in the art will recognize improvements and modifications to the preferred embodiments of the present invention. All such improvements and modifications are considered within the scope of the concepts disclosed herein and the claims that follow.

What is claimed is:

1. A wireless communications device, comprising:
    a GPS receiver adapted to receive GPS in-band radio-frequency (RF) signals in a GPS band;
    transmit circuitry onboard the wireless communications device adapted to transmit a radio-frequency (RF) signal in a wireless communications band that is different from the GPS band, wherein transmission of the RF signal causes a GPS in-band signal to be generated and received by the GPS receiver; and
    a control system onboard the wireless communications device adapted to test the GPS receiver by being adapted to:
        instruct the transmit circuitry to transmit the RF signal;
        determine a transmission noise level in the GPS receiver caused by receipt of the GPS in-band signal from the RF signal when the transmit circuitry is transmitting; and
        compare a nominal noise level representing a noise level in the GPS receiver based on the transmit circuitry not transmitting to the transmission noise level.

2. The wireless communications device of claim 1, wherein the control system is further adapted to determine the nominal noise level by measuring the noise level in the GPS receiver when the transmit circuitry is not transmitting.

3. The wireless communications device of claim 1, wherein the control system is further adapted to determine the nominal noise level by retrieving a nominal noise level pre-programmed into memory in the wireless communications device.

4. The wireless communications device of claim 1, wherein the control system is further adapted to test the GPS receiver without any external test equipment being coupled to the wireless communications device.

5. The wireless communications device of claim 1, wherein the wireless communications device comprises a mobile telephone.

6. The wireless communications device of claim 1, wherein the control system is further adapted to determine if the GPS receiver is operating properly based on the comparison of the nominal noise level to the transmission noise level.

7. The wireless communications device of claim 6, wherein the control system is further adapted to determine the GPS receiver is operating properly if the transmission noise level is greater than the nominal noise level.

8. The wireless communications device of claim 7, wherein the control system is adapted to determine the GPS receiver is operating properly if the transmission noise level is greater than the nominal noise level by at least a minimum threshold noise level.

9. The wireless communications device of claim 7, wherein the control system is further adapted to generate a test signal indicating the GPS receiver is operating properly if the transmission noise level is greater than the nominal noise level.

10. The wireless communications device of claim 7, wherein the control system is further adapted to generate a test signal indicating the GPS receiver is not operating properly if the transmission noise level is not greater than the nominal noise level.

11. The wireless communications device of claim 1, wherein the radio-frequency (RF) signal transmitted by the transmit circuitry further comprises a GPS out-of-band signal, wherein the GPS receiver is adapted to filter out the GPS out-of-band signal.

12. The wireless communications device of claim 1, wherein the GPS receiver comprises:
    an amplifier adapted to amplify a received GPS in-band signal based on a gain level to produce an amplified GPS in-band signal; and
    a signal processor adapted to process the amplified GPS in-band signal, wherein the signal processor is adapted to set the gain control level for the amplifier based on the noise present on the amplified GPS in-band signal;
    wherein the nominal noise level comprises a floor gain level for the amplifier based on the transmit circuitry not transmitting; and
    wherein the control system is adapted to determine the transmission noise level in the GPS receiver by being adapted to detect a transmission gain control level set by the signal processor when the transmit circuitry is transmitting.

13. The wireless communications device of claim 12, wherein the control system is further adapted to determine if the GPS receiver is operating properly based on a comparison of the floor gain level to the transmission gain control level.

14. The wireless communications device of claim 13, wherein the control system is adapted to determine if the GPS receiver is operating properly if the transmission gain control level is less than the floor gain level by a threshold gain level.

15. The wireless communications device of claim 1, wherein the GPS receiver comprises:
    an amplifier adapted to amplify a received GPS in-band signal to produce an amplified GPS in-band signal based on a gain level;
    an analog-to-digital (A/D) converter adapted to convert the amplified GPS in-band signal into digital data representing the amplified GPS in-band signal;
    a signal processor adapted to process the digital data, wherein the signal processor is adapted to set the gain control level for the amplifier based on the noise present in the digital data;
    wherein the nominal noise level comprises a floor data output by the A/D converter based on the transmit circuitry not transmitting;
    wherein the control system is further adapted to set the gain control level to a fixed gain level; and
    wherein the control system is adapted to determine the transmission noise level in the GPS receiver by being adapted to detect a transmission data generated by the A/D converter when the transmit circuitry is transmitting.

16. The wireless communications device of claim 15, wherein the control system is further adapted to determine if the GPS receiver is operating properly based on a comparison of the floor data to the transmission data.

17. A method of testing a GPS receiver in a wireless communications device, comprising the steps of:
  instructing transmit circuitry onboard a wireless communications device to transmit a radio-frequency (RF) signal in a wireless communications band that is different from a GPS band, wherein transmission of the RF signal causes a GPS in-band signal to be generated and received by a GPS receiver integrated into the wireless communications device;
  determining a transmission noise level in the GPS receiver caused by receipt of the GPS in-band signal from the RF signal when the transmit circuitry is transmitting; and
  comparing a nominal noise level representing a noise level in the GPS receiver based on transmit circuitry not transmitting to the transmission noise level.

18. The method of claim 17, further comprising determining if the GPS receiver is operating properly based on the comparing of the nominal noise level to the transmission noise level.

19. The method of claim 18, further comprising determining the GPS receiver is operating properly if the transmission noise level is greater than the nominal noise level.

20. The method of claim 19, wherein determining the GPS receiver is operating properly comprises determining the GPS receiver is operating properly if the transmission noise level is greater than the nominal noise level by at least a minimum threshold noise level.

21. The method of claim 19, further comprising generating a test signal indicating the GPS receiver is operating properly if the transmission noise level is greater than the nominal noise level.

* * * * *